(12) United States Patent
Slade (10) Patent No.: US 7,341,302 B2
(45) Date of Patent: Mar. 11, 2008

(54) SEATING ARRANGEMENT FOR A VEHICLE

(75) Inventor: Sean A. R. Slade, Bedfordshire (GB)

(73) Assignee: Nissan Motor Manufacturing (UK) Ltd. (GB)

( * ) Notice: Subject to any disclaimer, the term of this patent is extended or adjusted under 35 U.S.C. 154(b) by 9 days.

(21) Appl. No.: 10/513,892

(22) PCT Filed: May 9, 2003

(86) PCT No.: PCT/GB03/02005

§ 371 (c)(1),
(2), (4) Date: Aug. 15, 2005

(87) PCT Pub. No.: WO03/095263

PCT Pub. Date: Nov. 20, 2003

(65) Prior Publication Data

US 2006/0076795 A1    Apr. 13, 2006

(30) Foreign Application Priority Data

May 9, 2002    (GB)    ................... 0210666.4

(51) Int. Cl.
*B60N 2/32*    (2006.01)
(52) U.S. Cl. .................. 296/65.01; 296/69; 296/65.09; 296/65.11; 297/236
(58) Field of Classification Search .................. 296/64, 296/65.01, 65.05, 65.09, 65.11, 69; 297/236, 297/233, 232, 248, 331, 338, 383, 257
See application file for complete search history.

(56) References Cited

U.S. PATENT DOCUMENTS 223,031 A * 12/1879 Coolbaugh .................. 297/236

808,679 A * 1/1906 Pickles ....................... 297/236

(Continued)

FOREIGN PATENT DOCUMENTS

DE    945 489    7/1956

(Continued)

*Primary Examiner*—Dennis H. Pedder
*Assistant Examiner*—Mike Hernandez
(74) *Attorney, Agent, or Firm*—Ohlandt, Greeley, Ruggiero & Perle, L.L.P (57) ABSTRACT

A seating arrangement (9) comprises at least seat (11) and a second seat (12) arranged side by side. At least part of a seat member (12a) of the second seat (12) is displaceable in an up-down direction relative to the seat member (11a) of the first seat (11), and at least part of the seat back (12b) of the second seat (12) is displaceable in a forward-rearward direction relative the seat back (11b) of the first seat (11) so as to allow movement of at least one of the seats (11, 12) in a sideways direction toward the other. The seat member (12a) and the seat back (12b) of the second seat (12) may be foldable, in particular to form at lateral restraint and/or an arm rest, when the first and second seats (11, 12) are moved toward each other. Alternatively, the seat member (12a) and the seat back (12b) of the second seat (12) may be displaceable to below the seat member (11a) and behind the seat back (11b) of the first seat (11) respectively, when the first and second seats (11, 12) are moved toward each other.

30 Claims, 7 Drawing Sheets

U.S. PATENT DOCUMENTS

| | | |
|---|---|---|
| 1,643,236 A | 9/1927 | Bell |
| 2,621,708 A * | 12/1952 | Luce, Jr. .................... 297/117 |
| 2,699,202 A * | 1/1955 | Leary et al. ................ 297/233 |
| 2,839,312 A * | 6/1958 | Barenyi et al. ............. 280/775 |
| 3,637,253 A * | 1/1972 | Maule et al. ............ 296/65.11 |
| 4,341,415 A | 7/1982 | Braun et al. .............. 296/65 R |
| 4,496,189 A * | 1/1985 | Tanizaki et al. .............. 297/63 |
| 4,770,432 A * | 9/1988 | Wagner .................. 280/250.1 |
| 4,881,702 A * | 11/1989 | Slettebak ................. 244/118.6 |
| 5,913,568 A * | 6/1999 | Brightbill et al. ........ 297/258.1 |
| 6,129,405 A | 10/2000 | Miyahara et al. ........ 296/65.11 |
| 6,145,913 A | 11/2000 | Odagaki .................. 296/65.11 |
| 2002/0021016 A1 | 2/2002 | Bergquist et al. ........ 296/65.09 |
| 2005/0218683 A1 * | 10/2005 | Toyota et al. .................. 296/64 |

FOREIGN PATENT DOCUMENTS

| | | | |
|---|---|---|---|
| DE | 4337938 | | 5/1995 |
| DE | 200 00 479 | | 7/2001 |
| EP | 058 8693 | | 3/1994 |
| FR | 2 775 637 | | 9/1999 |
| FR | 2 811 620 | | 1/2002 |
| GB | 2288728 | | 11/1995 |
| JP | 2000-264109 | * | 9/2000 |
| JP | 2001001805 A | * | 1/2001 |
| WO | WO-92/03306 | * | 3/1992 |

* cited by examiner

SEATING ARRANGEMENT FOR A VEHICLE

RELATED APPLICATIONS

This application claims priority in PCT International Application No. PCT/GB03/02005, filed May 9, 2003, and Application No. GB 0210666.4, filed on May 9, 2002, the disclosures of which are incorporated herein by reference.

BACKGROUND OF THE INVENTION

1. Field of the Invention

This invention relates to a seating arrangement and in particular, but not exclusively, a seating arrangement for use in a vehicle such as an automotive vehicle.

2. Description of the Related Art

EP 0 588 693 B describes a seat arrangement for use in the rear of an automotive vehicle and adapted to provide two different seat configurations. In a first seat configuration, three seats are arranged in a row in a "side-by-side" fashion. A luggage compartment, usually accessible through the rear end of the vehicle (commonly known as the boot or trunk) is located behind the three rear seats. A first, centre one of the three seats is slidably mounted so that it can be moved in a rearward direction, along the longitudinal axis of the vehicle, into the luggage compartment. Second and third seats, located one on either side of the centre seat, are movable transversely, or sideways, towards one another, so that when the centre seat is moved into the luggage compartment, a second seat configuration is provided.

It is one disadvantage of this seat arrangement that the centre seat occupies a relatively large space in the luggage compartment when the second seat arrangement is adopted. This is a particular problem if a well is provided in the vehicle for a spare tyre, as access to the spare tyre well may be obstructed. It also restricts the space available for stowing luggage within the compartment.

Sideways movement of seats is desirable to enhance the comfort of a seat occupant, to provide access to an additional storage area, or to allow deployment of an accessory such as an arm rest, a table, or a viewing screen.

It is one object of the present invention to address the problems associated with known seat arrangements, whilst achieving at least one of the benefits of providing movable seats.

SUMMARY OF THE INVENTION

According to one aspect of the present invention, there is provided a seating arrangement comprising at least a first seat and a second seat arranged side by side, each of the first and second seats having a seat member and a seat back, wherein at least part of the seat member of the second seat is displaceable in an up-down direction relative to the seat member of the first seat, and at least part of the seat back of the second seat is displaceable in a forward-rearward direction relative to the seat back of the first seat so as to allow movement of at least one of the seats in a sideways direction toward the other.

In one preferred aspect, the invention provides a seat arrangement comprising a first seat and a second seat arranged side by side,
the second seat having a seat member, having first and second side edge seat member parts separated by an intermediate seat member part, and a seat back,
the first seat member having a seat member and a seat back having first and second side edge seat back parts, and
wherein said second seat member is foldable so that the side edge seat member parts thereof are movable toward each other, or approach each other, while the intermediate seat back part thereof is displaceable in an up-down direction, and the seat back of the second seat is foldable so that the side edge seat back parts thereof are movable toward each other, or approach each other, while the intermediate seat back part thereof is displaceable in a forward-rearward direction.

In another aspect the invention provides a seat arrangement comprising a first seat and a second seat arranged side by side, each of the first and second seats having a seat member and a seat back, one of the seats being movable in a sideways direction toward the other, whereby, in order to permit such movement, the seat member of the second seat is displaceable so as to be below the seat member of the first seat, and the seat back of the second seat is displaceable so as to be rearward of the seat back of the first seat.

In another aspect the invention provides a seating arrangement comprising three seats arranged side by side, in a row, each of the three seats having a seat member and a seat back, first and second, outer ones of the seats being movable toward each other, and a centre one of the seats being displaceable to a position in which the seat member thereof is below the seat members of the outer seats and the seat back thereof is behind the seat backs of the outer seats in circumstances in which the outer seats have been moved so as to be adjacent to one another.

BRIEF DESCRIPTION OF THE DRAWINGS

The invention will be described further, by way of example only, with reference to the accompanying drawings, in which.

DESCRIPTION OF THE INVENTION

Figure 1:
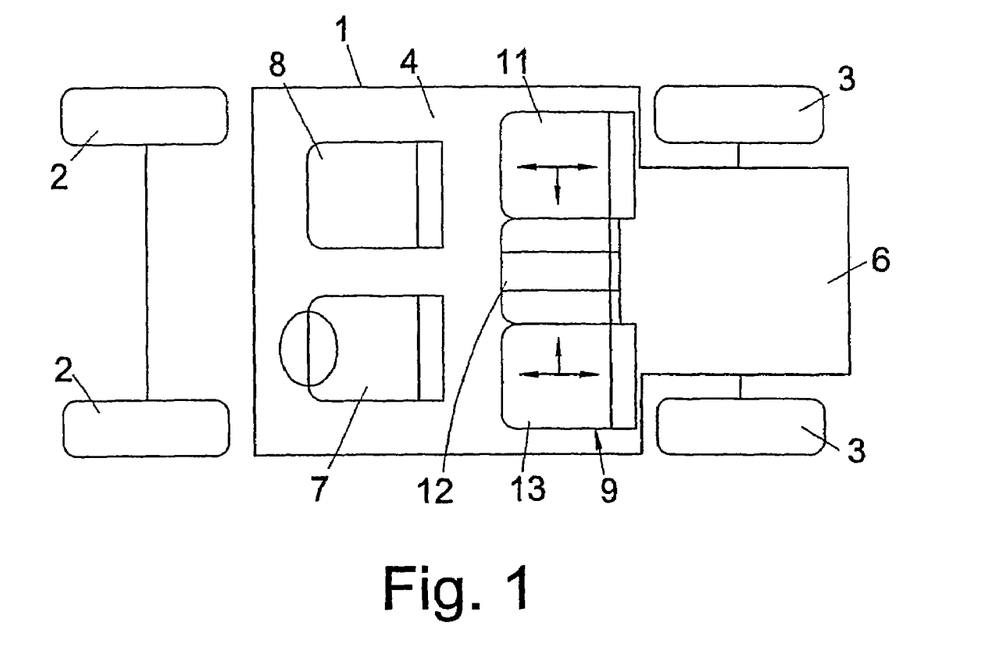
FIG. 1 is a diagrammatic plan view of a first embodiment of a seating arrangement, in an automotive vehicle, when a first seat configuration is adopted.

The vehicle illustrated in FIG. 1 has a body 1 mounted on front wheels 2 and rear wheels 3 of the vehicle, said body defining a passenger space 4 and a rear luggage compartment or space 6. At the front of the passenger space 4 there is a driver's seat 7 and a front passenger seat 8, each of which is independently adjustable at least in a forward-rearward direction by conventional means. That is, the seats 7, 8 are movable in a forward-rearward direction, between the forward (front) and rearward (rear) ends of the vehicle body 1, generally along the longitudinal axis of the vehicle body 1.

At the rear of the passenger space 4 there is a seating arrangement 9 in accordance with the present invention, comprising a row of three seats 11, 12, 13 arranged side by side across the vehicle body 1. First and third ones of the seats (outer seats), identified as items 11 and 13, are similar to each other and are symmetrically arranged with respect to a second seat 12 (centre or occasional seat). The seats 11, 12, 13 have respective seat portions 11a, 12a, 13a, or seat members, and seat back portions 11b, 12b, 13b, referred to as seat backs. Typically, the seat members take the form of seat cushions, or "squabs".

Figure 3:
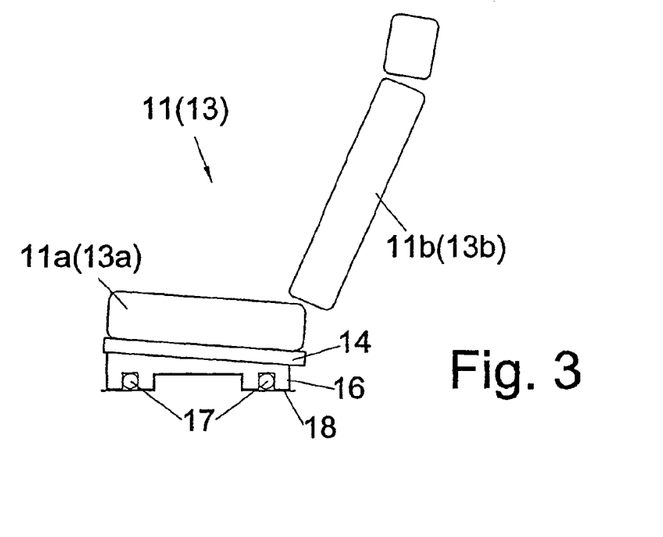
FIG. 3 is a diagrammatic side view of one of the outer seats in FIGS. 1 and 2.
Figure 4A:
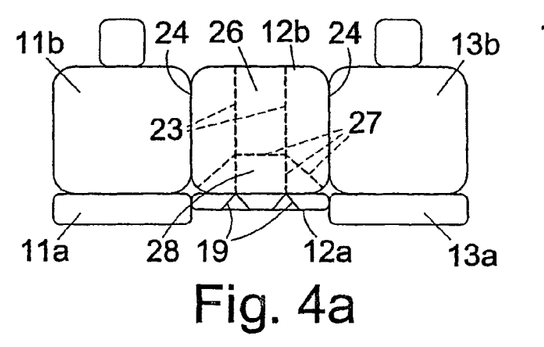
FIG. 4a is a front view of the seating arrangement, corresponding to FIG. 1.
Figure 4B:
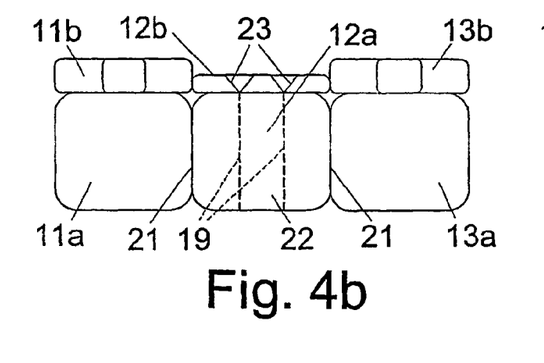
FIG. 4b is a plan view of the seating arrangement, corresponding to FIG. 1.
Figure 4C:
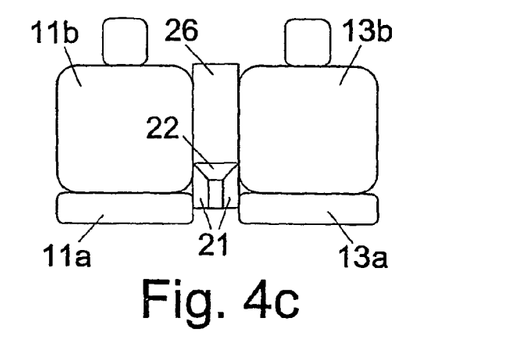
FIG. 4c is a front view of the seating arrangement, corresponding to FIG. 2.
Figure 4D:
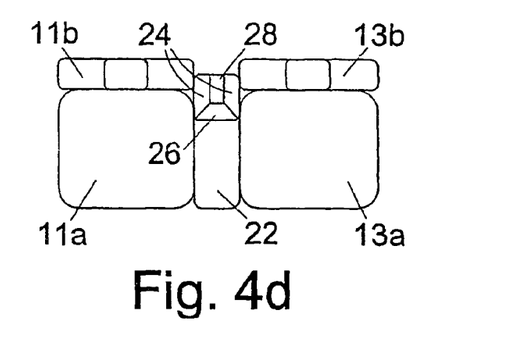
FIG. 4d is a plan view of the seating arrangement, corresponding to FIG. 2.

As shown in FIG. 3, the seat cushion 11a (or 13a) of each outer seat 11 (or 13) is slidably mounted, in a conventional way, by means of slides 14 so as to be movable in a forward-rearward direction (corresponding to the longitudinal axis of the vehicle) on a support base 16. The support base 16 is itself mounted on transverse slides 17 (fixed to the floor 18 of the passenger space 4) so that the outer seats 11 and 13 are movable sideways, or side to side, toward and away from each other. The longitudinal and transverse movements of the first and third seats 11, 13 are indicated by arrows in FIG. 1.

In FIG. 1, a first seat configuration is provided by the seats 11, 12, 13 for accommodating three passengers (a "three-seater mode"). The seat cushion 12a of the centre seat 12 is foldable along two mutually parallel fold lines defined by elongate recesses 19 in the underside of the seat cushion 12a. As the outer seats 11 and 13 are moved toward each other, the seat cushion 12a of the centre seat 12 is caused to fold so that side edge parts 21 thereof approach each other, in a plane generally level with the seat cushions 11a, 13a. The side edge parts 21 of the seat cushion 12a are separated by an intermediate part 22 of the cushion 12a which, as the cushion 12a starts to fold, is displaced in an up-down, or generally vertical, direction. In the embodiment as illustrated, the intermediate part 22 is displaced upwardly and the folded seat cushion 12a constitutes a lateral restraint in the form of an arm rest for a person seated on either one of the outer seats 11, 13.

Figure 2:
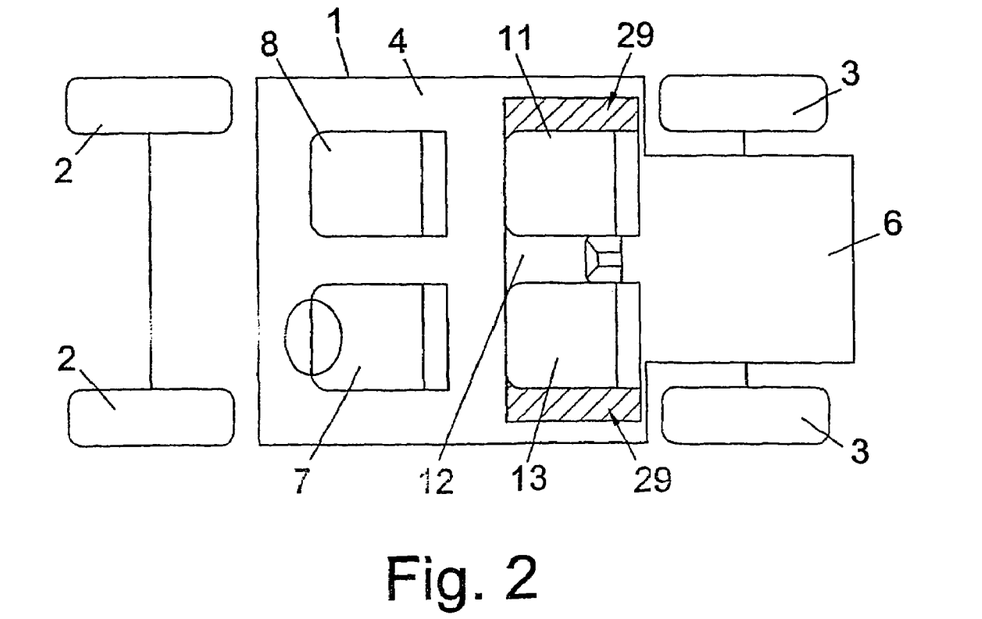
FIG. 2 is a view similar to FIG. 1, but with outer seats of the seat arrangement moved sideways toward each other to define a second seat configuration.

Similarly, the seat back 12b of the centre seat 12 is foldable along two mutually parallel fold lines defined by elongate recesses 23 so that side edge parts 24 of the seat back 12b approach or move toward each other while, and an intermediate part 26 of the seat back 12b is displaced in a forward-rearward direction with respect to the seat backs 11b, 13b of the first and third seats 11, 13. Thus, in this embodiment, the intermediate part 26 of the seat back is displaceable along the longitudinal axis of the vehicle body 1. In the embodiment illustrated, the intermediate part 26 of the seat back 12b is displaced forwards and constitutes a lateral restraint for a person seated in either one of the outer seats 11, 13. Thus, a second seat configuration is defined to provide seats for only two passengers (a "two-seater mode").

To prevent the folded seat back 12b from interfering with the upwardly folded seat cushion 12a, the seat back 12b is further foldable about supplementary fold lines 27 so that a lower portion 28 of the intermediate part 26 of the seat back 12b is displaceable in the opposite direction to the remainder of the intermediate part 26. In this example, therefore, the lower portion 28 is displaced rearwards while an upper portion is displaced forwards.

As can be seen in FIG. 2, when the outer seats 11, 13 have been moved towards each other, additional areas 29 of the passenger space 4 are accessible. These areas can be used for additional storage or to allow deployment of an accessory such as an arm rest, a table, or a viewing screen, for example.

If the outer seats 12, 13 are moved away from one another, the intermediate part 22 is displaced downwardly, unfolding the part 22 to return to the first seat configuration.

As can best be seen in FIGS. 4a to 4d, the seat cushion 12a and seat back 12b of the centre seat 12 are both thinner than the corresponding portions of the outer seats 11, 13, being, for example, about half the thickness. In this way it can be ensured that the centre seat 12, when folded, occupies about the same width as a conventional arm rest.

The seat cushion 12a and the seat back 12b of the centre seat (at least) may be constructed of hinged panels. For example, the seat cushion 12a may be hinged to the adjacent seat cushions, 11a and/or 13a, about an axis extending in a forward-rearward direction. The seat back 12b may be hinged to the adjacent seat backs, 11b and/or 13b, about an axis extending in a generally up-down direction (i.e. along the side edge part of the seat back 12b). The assembly of hinged panels may be covered with a layer of flexible foam plastics material covered in turn with a bonded fabric. The panels may be made of plastics material and may be connected by integral hinges. Alternatively, the panels may be made of sheet metal and may be connected by hinge pins.

Figure 5:
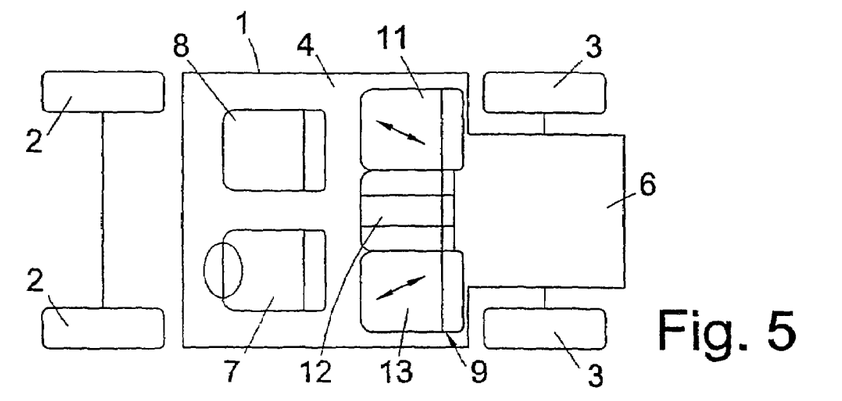
FIG. 5 is a view similar to FIG. 1, but showing a second embodiment of the invention.
Figure 6:
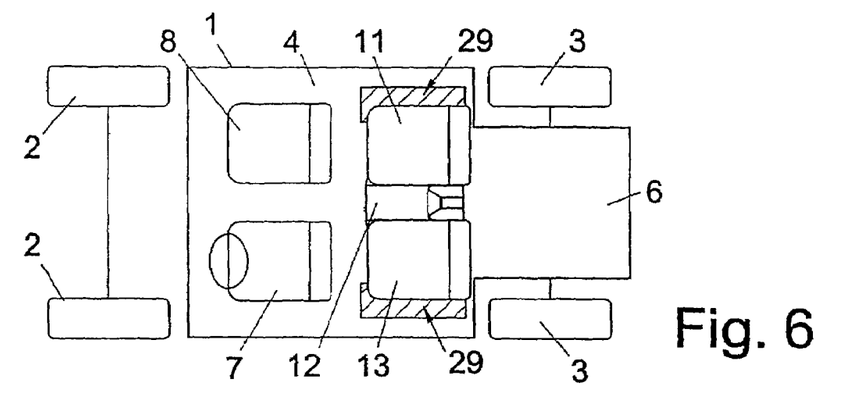
FIG. 6 is a view similar to FIG. 2, again showing the second embodiment.
Figure 7:
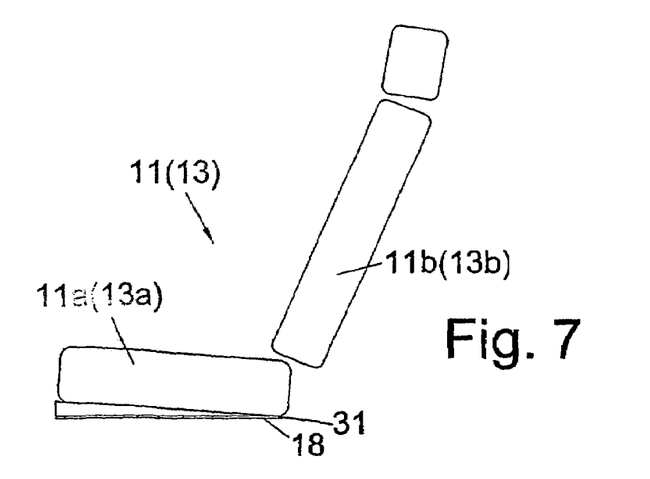
FIG. 7 is a view similar to FIG. 3, again showing the second embodiment.

The embodiment illustrated in FIGS. 5 to 7 differs from the above described embodiment only in the way in which the seat cushions 11a, 13a of the outer seats 11, 13 are mounted and, consequently, the way in which they move. Each seat cushion 11a (or 13a) is mounted on slides 31 (FIG. 7), which extend obliquely to the longitudinal direction of the vehicle on the floor 18 of the passenger space 4. The outer seats 11, 13 are thus slidable obliquely relative to the longitudinal axis of the vehicle so that they may be moved simultaneously away from or towards each other, as indicated by the arrows in FIG. 5. Thus, when the outer seats 11, 13 are moved in a rearward direction, the additional areas 29 are exposed to create additional leg room for occupants of said seats.

The embodiment illustrated in FIGS. 8 to 10d differs from the first embodiment only in the way in which the seat cushion 12a and seat back 12b of the centre seat 12 fold. The intermediate part 22 of the seat cushion 12a is continuously bendable (in other words it has a degree of flexibility) between the side edge parts 21, so as to form an arm rest having a convex upper surface when the seat cushion 12a is folded (as best seen in FIG. 10c). Similarly, the intermediate part 26 of the seat back 12b is flexible, or continuously bendable, between the side edge parts 24 thereof. In addition, the seat back 12b is foldable about a curved supplementary fold line 32 so that a lower portion 28 of the intermediate part 26 of the seat back 12b can be folded in the opposite direction to the remainder of the intermediate part 26 (i.e. an upper portion) and does not interfere with the upwardly folded seat cushion 12a. The seat cushion 12a and the seat back 12b may each comprise a semi-rigid resilient sheet material, which may be covered with a layer of flexible foam plastics material covered in turn with a bonded fabric.

Figure 8:
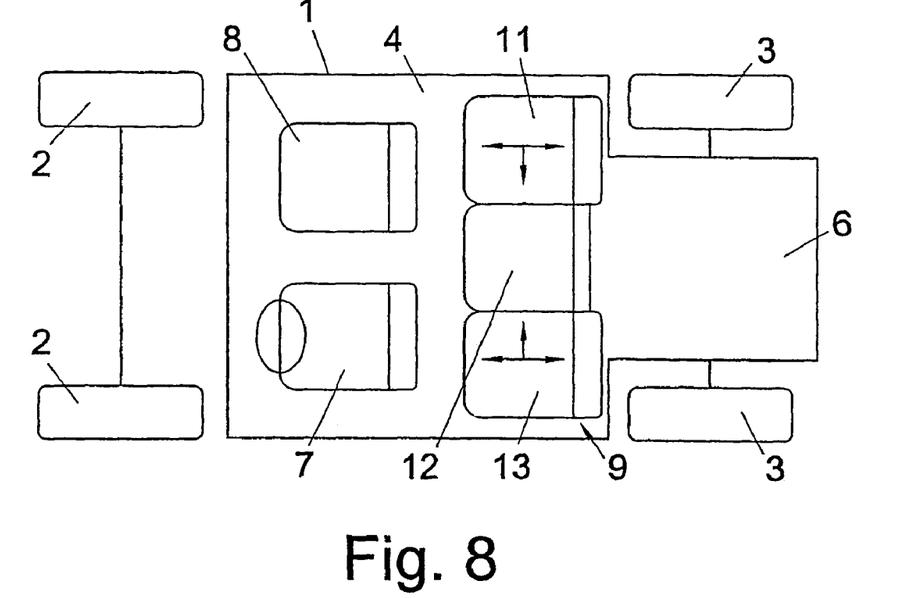
FIG. 8 is a view similar to FIG. 1, but showing a third embodiment.
Figure 9:
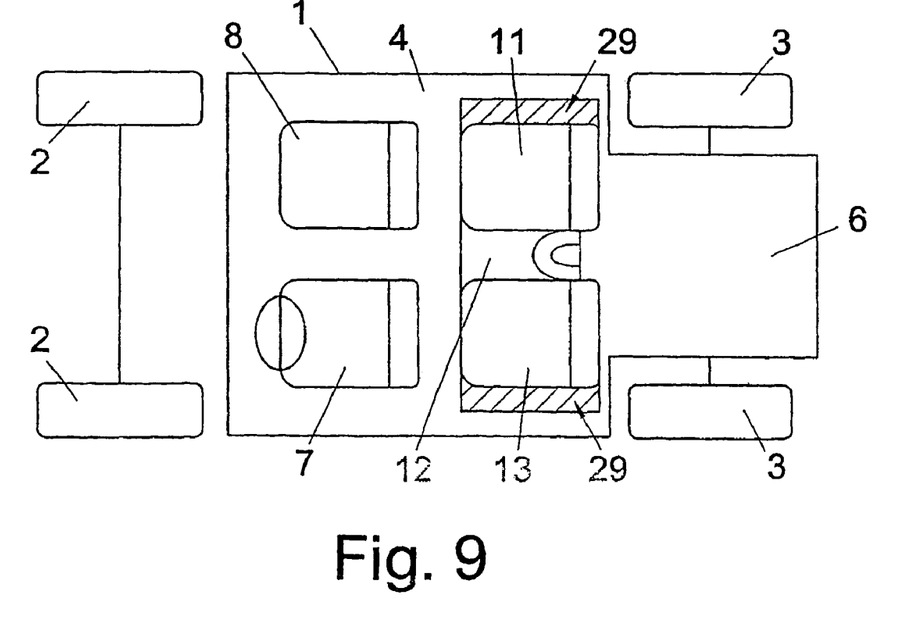
FIG. 9 is a view similar to FIG. 2, again showing the third embodiment.
Figure 10A:
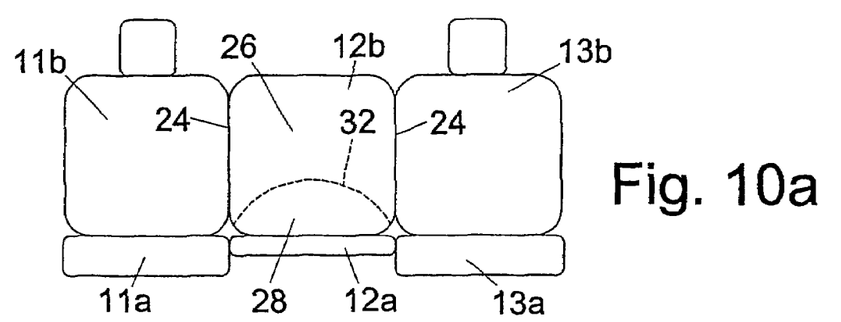
FIG. 10a is a front view of the seat arrangement, corresponding to FIG. 5.
Figure 10B:
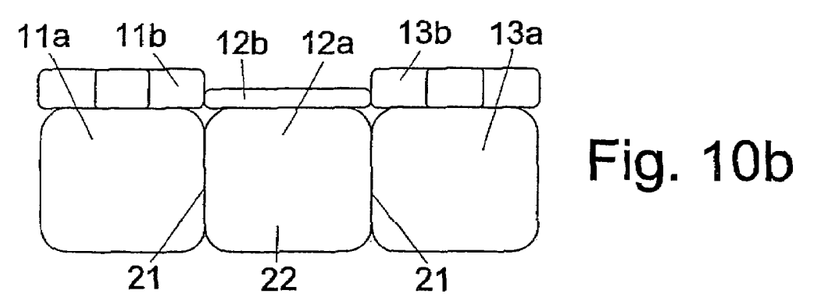
FIG. 10b is a plan view of the seat arrangement, corresponding to FIG. 8.
Figure 10C:
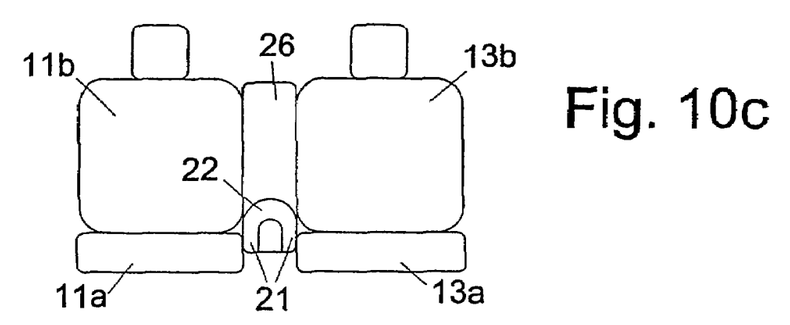
FIG. 10c is a front view of the seat arrangement, corresponding to FIG. 9.
Figure 10D:
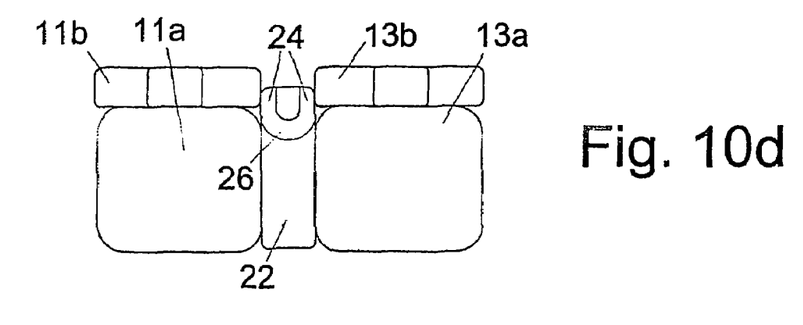
FIG. 10d is a plan view of the seat arrangement, corresponding to FIG. 9.
Figure 11:
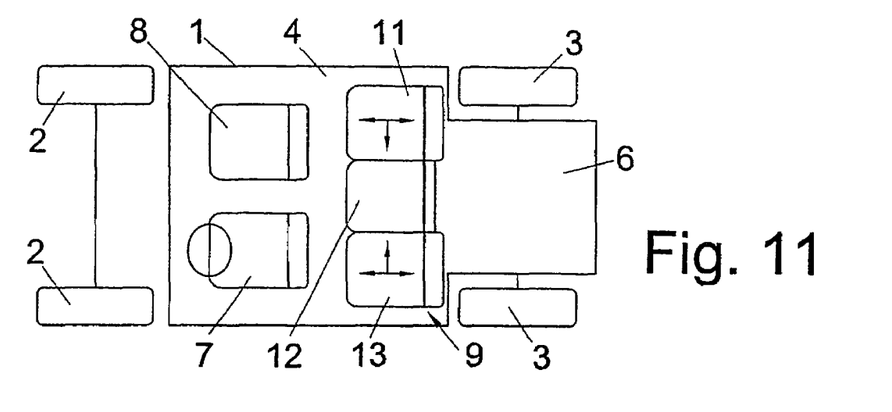
FIG. 11 is a diagrammatic plan view of a seating arrangement of a fourth embodiment, when a first seat configuration is adopted.
Figure 12:
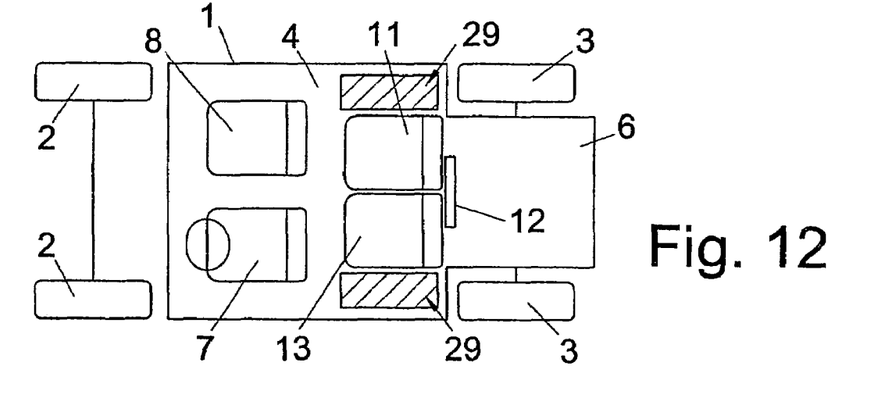
FIG. 12 is a view similar to FIG. 11, but with outer seats of the seat arrangement moved sideways toward each other to define a second seat configuration.
Figure 13:
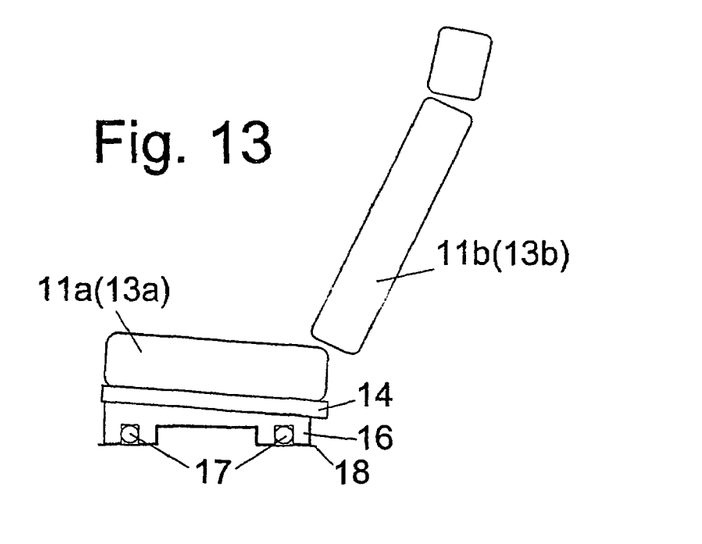
FIG. 13 is a diagrammatic side view of one of the outer seats of FIGS. 11 and 12.

As a modification, the outer seats 11, 13 in this embodiment may be mounted in the same way as the outer seats of the second embodiment, that is movable at an oblique angle to the longitudinal axis of the vehicle.

In the embodiment illustrated in FIGS. 11 to 15, the seat cushion 12a and seat back 12b of the centre seat 12 are displaced in a different way from those in the above described embodiments. Here, the seat cushion 12a is carried by a conventional lifter mechanism 33 which allows the whole seat 12 to be displaced both downwardly and rearwardly. The outer seats 11, 13 are movable towards each other when the seat cushion 12a of the centre seat has been displaced to below the level of the seat cushions 11a, 13a of the outer seats and the seat back 12b of the centre seat has been displaced to a position just to the rear of the seat backs 11b, 13b of the outer seats 11, 13 (as best seen in FIGS. 14c and 14d).

Figure 14A:
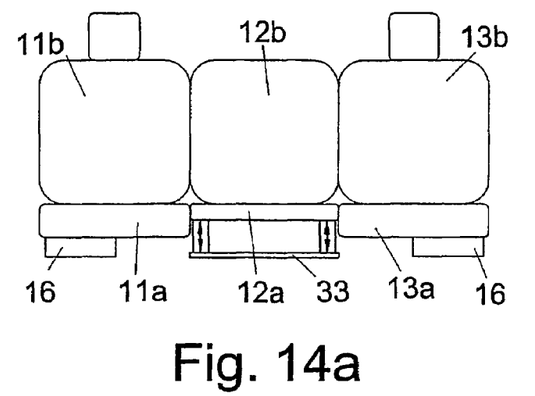
FIG. 14a is a front view of the seat arrangement, corresponding to FIG. 11.
Figure 14B:
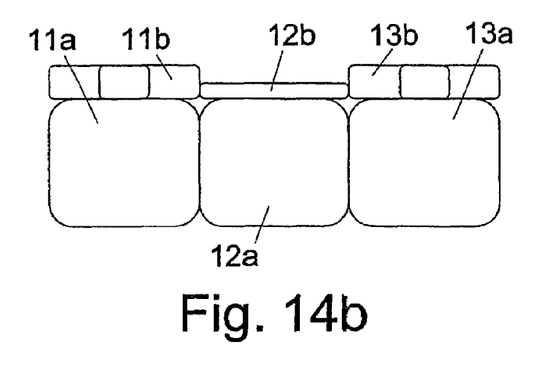
FIG. 14b is a plan view of the seat arrangement, corresponding to FIG. 11.
Figure 14C:
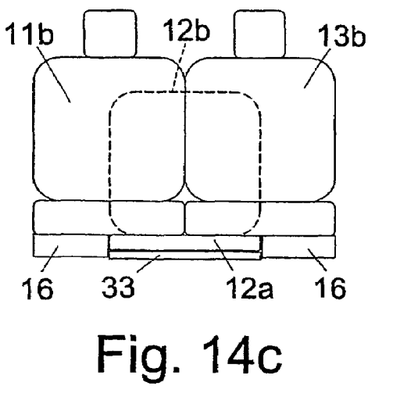
FIG. 14c is a front view of the seat arrangement, corresponding to FIG. 12.
Figure 14D:
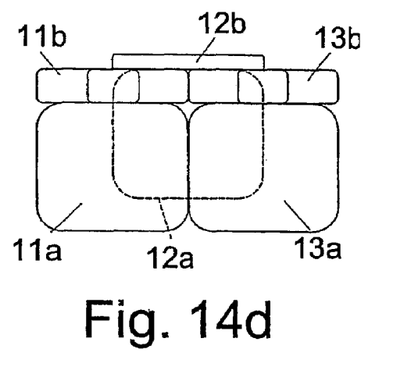
FIG. 14d is a plan view of the seat arrangement, corresponding to FIG. 12.
Figure 15:
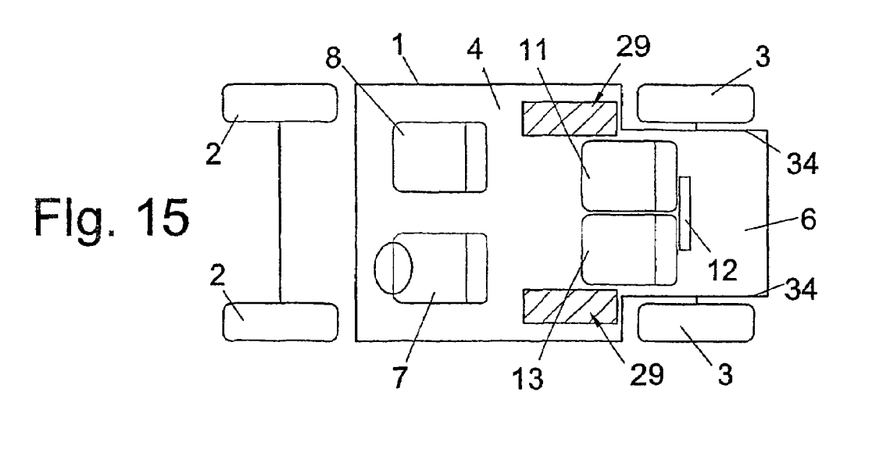
FIG. 15 is a view similar to FIG. 12, but with the seat arrangement moved rearward.

As can be seen in FIGS. 14c and 14d, the outer seats 11, 13 may be moved so that they are side by side, adjacent to and in contact with each other. It will be appreciated that the additional areas 29 exposed in this embodiment can be larger than the equivalent areas in the preceding embodiments (e.g. as shown in FIG. 2). Furthermore, and as shown in FIG. 15, the combined transverse dimension of the outer seats 11, 13 may be such that the group of seats 11 to 13 can be moved rearward, beyond the front of wheel arches 34 of the vehicle and into the luggage space 6, thereby creating a larger entrance and exit area for the rear passengers, more leg room, or a storage space in front of the rear seats. Rearward movement of the group of seats 11 to 13 is permitted by the slides 14 (FIG. 13) of the outer seats 11, 13 and the lifter mechanism 33 of the centre seat 12. It is also possible for the seats (and their associated sliding and lifting mechanisms) to be mounted on rails extending longitudinally on the floor of the vehicle body 1.

Various modifications may be made within the scope of the invention. For example, any of the features of any of the above described embodiments may be used in another one of the embodiments. In particular the seat cushion of the second or centre seat may be foldable while the seat back is displaceable as a whole, or vice versa.

The seat cushion of the second or centre seat may be foldable downwardly, instead of upwardly, so that the centre seat 12 is accommodated below the level of the outer seat cushions 11a, 13a when the second seat configuration is provided (two-seater mode). The seat back 12b of the second or centre seat may be folded rearwardly, instead of forwardly, so that it extends into the luggage space 6 when in the two-seater mode. In an embodiment in which the seat back 12b of the second or centre seat 12 is movable rearwardly relative to the seat backs 11b, 13b of the outer seats 11, 13, this movement may be in a generally vertical or up-down direction if the seat backs 11b, 13b are tilted back at a large enough angle (depending on the thickness of the seat backs) relative to the longitudinal axis of the vehicle body 1.

Although the seating arrangement of the invention has been described as a group of three seats, this is only by way of example and there may alternatively be a different number of seats, e.g. two or four seats. For example, if only first and second seats are provided, the first seat may be movable sideways toward the second seat, or the second seat may be movable sideways toward the first seat, or both of them may be movable sideways toward each other. In each case, additional room will be created in the passenger space to the side of one or the other seats.

The invention claimed is:

1. A seating arrangement for use in a vehicle, the seating arrangement comprising at least a first seat and a second seat arranged side by side, each of the first and second seats having a seat member and a seat back, wherein at least part of the seat member of the second seat is displaceable in an up-down direction relative to the seat member of the first seat, and at least part of the seat back of the second seat is displaceable in a forward-rearward direction relative to the seat back of the first seat so as to allow movement of each of the seats in a sideways direction toward the other.

2. The seating arrangement of claim 1, wherein the seat member of the second seat comprises side edge seat member parts separated by an intermediate seat member part, and wherein the seat member is foldable to permit the side edge seat member parts to be moved toward each other while the intermediate seat member part is displaceable in an up-down direction.

3. The seating arrangement of claim 2, wherein the intermediate seat member part is displaceable in an upward direction as the side edge seat member parts are moved toward each other.

4. The seating arrangement of claim 2, wherein the seat member of the second seat is foldable along at least one predetermined fold line.

5. The seating arrangement of claim 4, wherein the fold line is defined by an elongate recess in the second seat member.

6. The seating arrangement of claim 4, wherein the seat member of the second seat is foldable along two mutually parallel fold lines.

7. The seating arrangement of claim 2, wherein the seat member of the second seat is foldable by continuous bending between the side edge seat member parts.

8. The seating arrangement of claim 2, wherein, when the seat member of the second seat is folded, the seat member constitutes an arm rest for a person seated on the first seat.

9. The seating arrangement of claim 2, wherein the seat members of the first and second seats are hinged together about an axis extending in a forward-rearward direction.

10. The seating arrangement of claim 1, wherein the seat member of the second seat is displaceable so as to be below the level of the seat member of the first seat.

11. The seating arrangement of claim 1, wherein the seat back of the second seat comprises side edge seat back parts separated by an intermediate seat back part, and wherein the seat back of the second seat is foldable to permit the side edge seat back parts to move toward each other while at least an upper portion of the intermediate seat back part is displaceable in a forward-rearward direction.

12. The seating arrangement of claim 11, wherein at least the upper portion of the intermediate seat back part is displaceable in a forward direction as the side edge seat back parts move toward each other.

13. The seating arrangement of claim 11, wherein the second seat back is foldable along at least one predetermined fold line.

14. The seating arrangement of claim 13, wherein the second seat back is foldable along two mutually parallel fold lines.

15. The seating arrangement of claim 11, wherein the intermediate seat back part of the seat member is continuously bendable between the side edge seat back parts.

16. The seating arrangement of claim 11, wherein, when the seat back of the second seat is folded, the folded seat back constitutes a lateral restraint for a person seated on the first seat.

17. The seating arrangement of claim 11, wherein the seat back of the second seat is foldable so that a lower portion of the intermediate seat back part is displaced in the opposite direction to the upper portion of the intermediate seat back part.

18. The seating arrangement of claim 17, wherein the lower portion is separated from the upper portion along at least one predetermined fold line.

19. The seating arrangement of claim 11, wherein the seat backs of the first and second seats are hinged together about an axis extending in an up-down direction.

20. The seating arrangement of claim 1, wherein the seat back of the second seat is displaceable so as to be rearward of the seat back of the first seat.

21. The seating arrangement of claim 1, wherein the seat member of the second seat is thinner than the seat member of the first seat.

22. The seating arrangement of claim 1, wherein the first seat is movable in a sideways direction toward the second seat.

23. The seating arrangement of claim 22, wherein the first seat is mounted on slides so as to permit movement of the first seat in a sideways direction.

24. The seating arrangement of claim 23, wherein the first seat is mounted on a support so as to be movable in a forward-rearward direction relative to the support, wherein the support is mounted on the slides so as to permit movement of the first seat in a sideways direction.

25. The seating arrangement of claim 23, wherein the first seat is movable in an oblique direction relative to a longitudinal axis of the vehicle.

26. The seating arrangement of claim 1, wherein the second seat is a centre seat of a three seat arrangement having three seats arranged side by side in a row, a first seat being located on one side the centre seat and a third seat being located on the other side of the centre seat.

27. The seating arrangement of claim 26, wherein the third seat is movable toward and away from the first seat.

28. The seating arrangement of claim 26, wherein, when the first and third seats are moved toward each other causing the seat member and seat back to be displaced, the seats are movable as a group in a rearward direction relative to a front end of the vehicle.

29. A seating arrangement comprising a first seat and a second seat arranged side by side, each of the first and second seats having a seat member and a seat back, wherein the seat member of the second seat has side edge seat member parts separated by an intermediate part, wherein said seat member is foldable so that the side edge seat member parts are movable toward each other while the intermediate seat member part is displaceable in an up-down direction relative to the seat member of the first seat, and wherein the seat back of the second seat has side edge seat back parts separated by an intermediate seat back part, and wherein the seat back of the second seat is foldable so that the side edge seat back parts thereof are movable toward each other while the intermediate seat back part thereof is displaceable in a forward-rearward direction relative to the seat back of the first seat.

30. The vehicle of claim 1, wherein the seating arrangement is behind a seat of a driver of the vehicle.

* * * * *